United States Patent Office 2,965,628
Patented Dec. 20, 1960

2,965,628

PROCESS FOR PRODUCING POLYETHYLENE

Shigeru Tsutsumi, 204 Okashinmachi, Hirakata-City, Osaka, Japan

No Drawing. Filed May 15, 1957, Ser. No. 659,220

2 Claims. (Cl. 260—94.9)

This invention relates to improvements in or relating to a process for producing polyethylene.

Heretofore, polyethylene has been produced under extremely high pressures, such as for example from 1,000 to 1,500 atm. with such a catalyzer as oxygen. According to the other conventional processes referred to as the low pressure low temperature polymerization process, aluminum triethyl or chrome oxide carried by a suitable carrier is used as a catalyzer.

The object of this invention is to provide a novel and useful process for producing polyethylene.

It has been found that cobalt chloride carried by a certain carrier is extremely excellent as a catalyzer for polymerizing ethylene to polyethylene. Cobalt chloride is exceedingly stable even at temperatures higher than 500° C. Therefore, the reactivation of the catalyzer can be effected easily by burning carbon deposited thereon in the course of the polymerization, which constitutes one of the characteristics of the process of this invention.

It should be noted that selection of a suitable solvent is important for producing polyethylene according to the present invention. For instance, if the operation is carried out in the absence of the solvent, the polymerization of ethylene will proceed but in such a case the product obtained is of exclusively low molecular polymers which are of no use to the application for polyethylene. In this connection, it has been confirmed by testing suitability of paraffin hydrocarbons such as n-hexane and n-heptane, and aromatic hydrocarbons such as benzene, toluene and xylene, as a solvent, that naphthene hydrocarbons, especially methylcyclohexane and dimethylcyclohexane which may be prepared by hydrogenating toluene and xylene, respectively, are most suitable for that purpose.

If a larger amount of a catalyzer is used in a solvent, the reaction will proceed more rapidly, but a larger quantity of low molecular polymers are found in the product. It is considered that the polymerization of ethylene is effected on the surface of the catalyzer while the chain polymerization reaction also terminates on the catalyzer. In view of this, it is preferable to use the catlayzer as small as possible. It has been found that silica-alumina is the most preferable carrier as compared with silica or alumina alone. It is, however, possible to use another adequate carrier depending upon the degree of polymerization required.

Now a few embodiments of the invention will be set forth in the following:

*Example I*

A catalyzer was prepared by supporting 2% cobalt chloride on silica-alumina (98.5:1.5) and burning them at a temperature of 500° C. On the other hand, ethylene was introduced into a 1 litre shaking autoclave containing 75 cc. of methylcyclohexane and 1 gramme of the said catalyzer and was compressed to a starting pressure of 40 kg./cm.$^2$. Under such conditions, the shaking was continued at 230° C. for about 6 hours to proceed the reaction, yielding crystalline polyethylene after cooling. Additionally, it was obtained from the solvent an ointment-like material which amounted to 25 parts to one part of the crystalline product. Molecular weight of said crystal was 3,800 while that of the ointment-like material was 1,800.

*Example II*

Under the same conditions as in the preceding example except for a reaction temperature of 180° C., the reaction was continued to produce polyethylene, almost the whole quantity of which was separated on the inner wall of the autoclave. Molecular weight of the product was about 12,000. And when the reaction temperature was kept low down to 150° C., the molecular weight of the product was 18,000 and when the reaction temperature was 120° C., the molecular weight of the crystal separated after the reaction period of 8 hours was 23,000. By using dimethylcyclohexane instead of methylcyclohexane as the solvent, almost the same results were obtained.

*Example III*

When either alumina or silica gel was used as the carrier for the catalyzer under the similar conditions as in the preceding examples, the reaction did not proceed remarkably at a temperature of 120° C., while at a temperature of 150° C. the reaction proceeded to obtain a product having a molecular weight in the range of 12,000 after the reaction period of 8 hours.

Although the content of cobalt chloride in the carrier used as above was 2%, it was found that use of a larger content of the same than that specified as above results in a smaller molecular weight of the product while in case of a smaller content of the same it results to slow down the reaction.

I claim:

1. In a method of producing polyethylene, the step of subjecting ethylene to polymerization at a temperature of at least 150° C. and a pressure of approximately 40 kg./cm.$^2$ in the presence of a naphthene hydrocarbon selected from the group consisting of methylcyclohexane and dimethylcyclohexane and in the presence of approximately 2% by weight of cobalt chloride distributed on silica-alumina as carrier prepared by burning said cobalt chloride on said silica-alumina at a temperature of approximately 500° C.

2. In a method of producing polyethylene, the step of heating ethylene at a temperature of at least 150° C. under a pressure of up to 40 kg./cm.$^2$ in the presence of a naphthene hydrocarbon selected from the group consisting of methylcyclohexane and dimethylcyclohexane and in the presence of approximately 2% by weight of cobalt chloride distributed on silica-alumina as carrier and prepared by burning said cobalt chloride on said silica-alumina at a temperature of approximately 500° C., so as to polymerize said ethylene.

References Cited in the file of this patent

UNITED STATES PATENTS

| | | |
|---|---|---|
| 1,933,702 | Brown | Nov. 7, 1933 |
| 1,934,896 | Wagner | Nov. 14, 1933 |
| 2,286,129 | Veltman | June 9, 1942 |
| 2,451,180 | Stewart | Oct. 12, 1948 |
| 2,581,228 | Bailey et al. | Jan. 1, 1952 |
| 2,589,189 | Ciapetta et al. | Mar. 11, 1952 |
| 2,727,023 | Evering et al. | Dec. 13, 1955 |
| 2,731,452 | Field et al. | Jan. 17, 1956 |

FOREIGN PATENTS

| | | |
|---|---|---|
| 1,138,985 | France | Feb. 4, 1957 |
| 779,111 | Great Britain | July 17, 1957 |